UNITED STATES PATENT OFFICE.

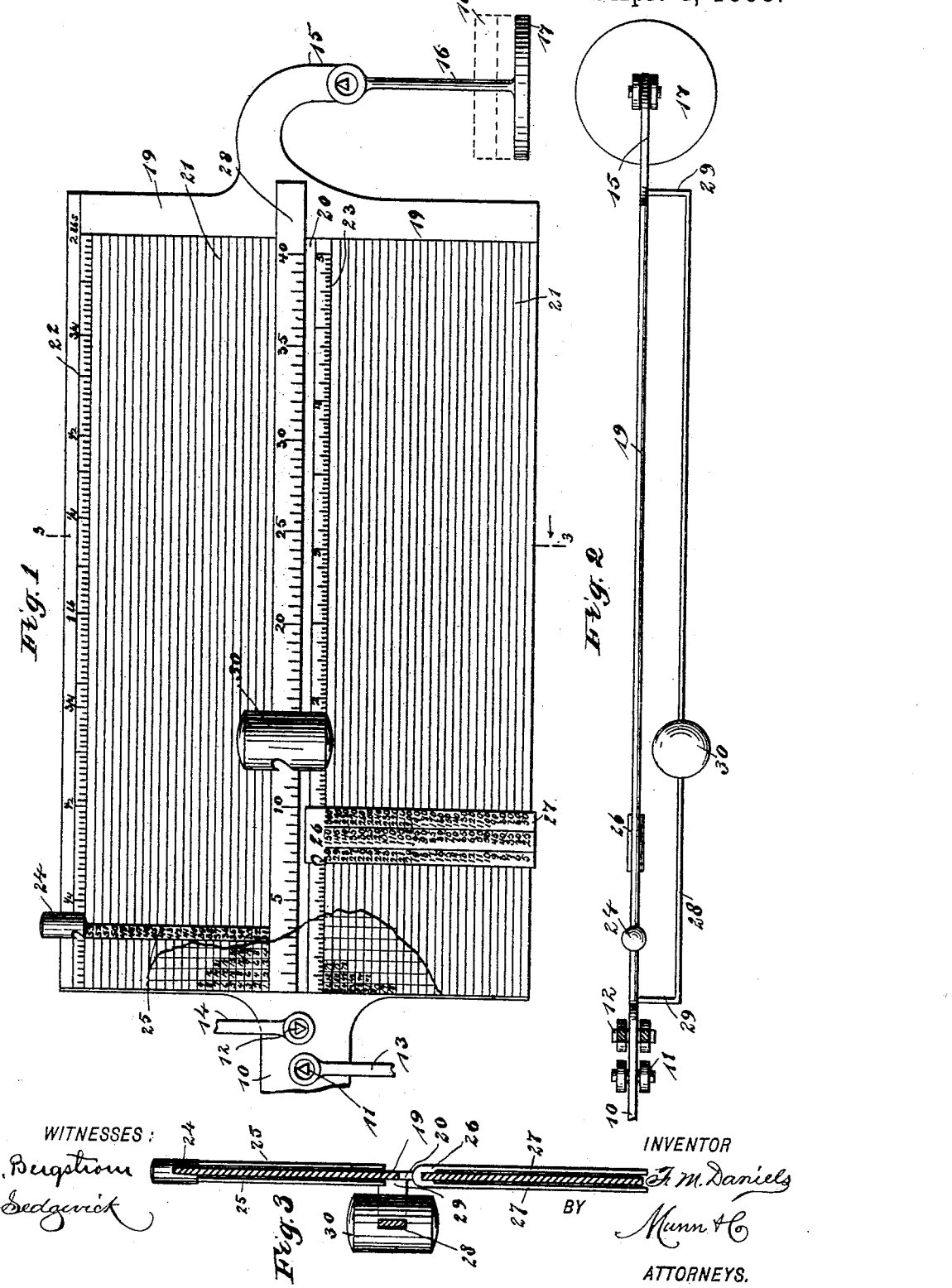

FRANK M. DANIELS, OF TRAVERSE CITY, MICHIGAN.

COMPUTING SCALE-BEAM.

SPECIFICATION forming part of Letters Patent No. 494,552, dated April 4, 1893.

Application filed May 11, 1892. Serial No. 432,652. (No model.)

*To all whom it may concern:*

Be it known that I, FRANK M. DANIELS, of Traverse City, in the county of Grand Traverse and State of Michigan, have invented a new and Improved Computing Scale-Beam, of which the following is a full, clear, and exact description.

My invention relates to improvements in computing scale beams, and the object of my invention is to produce a scale beam having a number of counterpoises thereon, and which, by properly manipulating the counterpoises, will instantly indicate the price of a certain weight of goods, and will indicate the amount of goods which may be sold for a certain price, and which may also be used for weighing goods in the ordinary way.

To this end, my invention consists in a scale beam, the construction of which will be hereinafter described and claimed.

Reference is to be had to the accompanying drawings forming a part of this specification, in which similar figures of reference indicate corresponding parts in all the views.

Figure 1 is a broken side elevation of a scale beam embodying my invention. Fig. 2 is a plan view of the same; and Fig. 3 is a cross section on the line 3—3 in Fig. 1.

The main scale beam 10, is fulcrumed on the knife-edge bearings 11 and 12, of the upwardly and downwardly extending supports 13 and 14, and it terminates at its free end in a depending hook 15, to which is pivoted the rod 16, which carries the weight-plate 17, upon which the weights 18 are placed, the above arrangement being of the ordinary kind, but the scale beam may be fulcrumed in any of the usual ways and applied to any ordinary scales.

The scale beam has its main portion formed into a wide plate 19, which is divided centrally and longitudinally by a slot 20, to permit of the movement of the lower counterpoise as hereinafter described. This slot divides the scale beam into an upper and lower part each of which is divided by parallel longitudinal lines 21, these lines being subdivided by one cent marks, the marks being arranged differently in each space, and the number of cent marks in each space formed by the lines 21 is found by multiplying the capacity of that part of the beam on which the lines are produced by the price per pound represented by each line. The cent marks are not shown in the drawings, as it will be seen that to produce them would make the scale beam very obscure. The arrangement of the cent marks will, however, be more fully described below.

The upper portion of the scale beam has a graduated scale 22, which is divided into quarter ounce marks, and has a capacity of two pounds, and the lower portion of the scale beam has at its upper edge a scale 23, with a capacity of five pounds and divided into one-half-pound notches, but it will be understood that the scale beam may be made to have a greater or less capacity if desired. On the upper portion of the scale beam is a sliding counterpoise 24, which has depending arms 25 which straddle the scale beam, and on which are produced in regular numerical order, reading from bottom to top, the price per pound of articles, the prices, as shown in the drawings, ranging from thirty-one cents to fifty-three cents, and each price is placed opposite a space between the lines 21 on the scale beam. The scale beam is made alike on both sides, and both arms of the counterpoise 24 and the counterpoise 26, which will be described below, are numbered so that both the seller and purchaser may watch the scales while the weight or computation is being made. The counterpoise 26 is held to slide on the lower scale 23, and it has depending arms 27, which straddle this portion of the scale beam, and on these arms are produced columns of figures representing prices per pound, the figures being similarly arranged on both arms, but a greater or less number of columns may be produced. As shown in the drawings, the first column to the left ranges in price from five cents to thirty cents; the next column from twenty-five cents to one dollar and fifty cents and the next from fifty cents to three dollars, the figures all being arranged so that they will come consecutively opposite the spaces formed between the lines 21 on the scale beam. The main beam is also provided with a tare beam 28, which is arranged parallel with the main beam and nearly opposite the slot 20, this beam being connected with the main beam by bent ends 29, and it is thus held far enough from the main beam so that its counterpoise 30 may slide freely upon it without interfering with the poise 26 on the lower portion of the scale beam.

The cent marks in each space formed between the lines 21, and alluded to above, are arranged as follows: In the lower space on the upper portion of the beam, which space represents a price per pound of thirty-one cents, as indicated on the arm 25 of the counterpoise 24, there would be sixty-two cent marks, that is, the capacity of this portion of the beam (two pounds) multiplied by thirty-one, the price per pound of the numbered spaces. The next space above would have sixty-four cent marks therein, the next sixty-six, and so on.

A few examples of the manner in which the beam is used will render its operation clear. We will suppose that one dollar and ninety-two cents worth of twenty-one cent goods is to be sold; a five pound weight is placed upon the plate 17, and this will represent one dollar and five cents; to wit, five times twenty one, and the counterpoise 26 is then moved till eighty-seven cents is shown at the left of the poise and opposite the price 21 on the arm 27. The beam will then express one dollar and ninety-two cents, to wit, one dollar and five cents, the value of the weight on the plate 17 plus eighty-seven, the amount indicated on the beam. The goods are then placed in the scale and made to balance the beam. We will suppose a person bought a crock of butter and the crock weighed nine and one-half pounds, and was to pay nineteen cents per pound. The counterpoise 30 is moved on the beam 28 to indicate nine and one-half pounds, thus balancing the crock; weights are added to the plate 17, the weigher using his judgment as to which is nearest, say a ten pound weight being used, which represents one dollar and ninety cents at the price per pound; the poise 26 is then moved out to get a balance, and if it stops so that the price nineteen on the arm 27 appears opposite the mark seventy-one on the lower portion of the scale beam, the price indicated would be one dollar and ninety cents plus seventy-one, or two dollars and sixty-one cents, and the weight thirteen and fourteen-nineteenths pounds, this being indicated without using a pencil to figure the tare or anything else. Suppose seventeen cents worth of forty-six cent tea is to be sold; move the poise 24 till the left hand edge of the arm 25 is opposite 17 in the forty-six cent space, and the tea is made to balance the scales, it taking seventeen forty-sixths of a pound to do this. If one dollar and seventeen cents worth of the same tea is wanted, the poise 30 is moved to two pounds, which represents ninety-two cents in value, leaving twenty-five cents worth to get, which is done by moving the upper poise 24 till the price forty-six is even with twenty-five in the forty-six cent space, and the tea is made to balance the scales, two and twenty-five forty-sixths pounds being necessary to do this. The lower poise 26 is used in precisely the same manner when larger amounts are to be found and larger weights used, but in this case the five and ten pound value columns of the arms 27 are used, and the computation made in exactly the manner indicated above.

Having thus described my invention, I claim as new and desire to secure by Letters Patent—

1. The combination with a scale beam 10 having a flat plate 19 on its outer end provided with a longitudinal slot 20, each plate section having weight graduations along its upper edge and longitudinally extending lines 21 subdivided by cent marks, of an upper counterpoise 24 sliding on the upper edge of the upper graduated member and having a depending graduated arm 25 and the lower counterpoise 26 on the upper edge of the lower member and also having a depending graduated member, substantially as set forth.

2. A scale beam provided with a flat plate 19 on its outer end and having a longitudinal slot 20, weight graduations along the upper edges of the two plate sections, and longitudinal lines 21 subdivided by cent marks, the upper and lower counterpoises 24, 26 having depending graduated members, the tare beam 28 parallel with the plate and secured at its ends 29, 29 to one face thereof midway its upper and lower edges, and the slide 30 thereon, substantially as set forth.

FRANK M. DANIELS.

Witnesses:
  JOHN VERLY,
  S. M. BROWN.